United States Patent [19]

Deutsch

[11] Patent Number: 5,027,785
[45] Date of Patent: Jul. 2, 1991

[54] SIMPLIFIED IGNITION SYSTEM FOR MULTI-CYLINDER ENGINES

[75] Inventor: Robert W. Deutsch, Sugar Grove, Ill.

[73] Assignee: Motorola, Inc., Schaumburg, Ill.

[21] Appl. No.: 512,233

[22] Filed: Apr. 19, 1990

[51] Int. Cl.$^5$ ............................................. F02P 3/12
[52] U.S. Cl. ................................................. 123/643
[58] Field of Search ............... 123/643, 146.5 A, 628, 123/596, 414, 594, 602, 636, 647; 324/379

[56] References Cited

U.S. PATENT DOCUMENTS

| | | | |
|---|---|---|---|
| 4,597,366 | 7/1986 | Chan | 123/146.5 A |
| 4,660,534 | 4/1987 | Cotigsoli | 123/643 |
| 4,681,082 | 7/1987 | Onogi et al. | 123/643 |
| 4,690,124 | 9/1987 | Higashiyama | 123/643 |
| 4,726,347 | 2/1988 | Sasaki et al. | 123/643 |
| 4,795,979 | 1/1989 | Kreft et al. | 324/379 |
| 4,881,512 | 11/1989 | Erskine et al. | 123/628 |
| 4,886,036 | 12/1989 | Johannsson et al. | 123/596 |
| 4,889,094 | 12/1989 | Beyer et al. | 123/414 |
| 4,938,200 | 7/1990 | Iwasaki | 123/620 |

Primary Examiner—Raymond A. Nelli
Attorney, Agent, or Firm—John H. Moore

[57] ABSTRACT

Fuel is sequentially injected directly into each cylinder of a an engine that has at least three cylinders. Then, an ignition potential is applied to all cylinders simultaneously, but at an angle that ensures that only a selected one of the cylinders experiences combustion. This technique is repeated for each remaining cylinder, so as to fire one cylinder at a time even through an ignition potential is applied to all cylinders simultaneously.

9 Claims, 1 Drawing Sheet

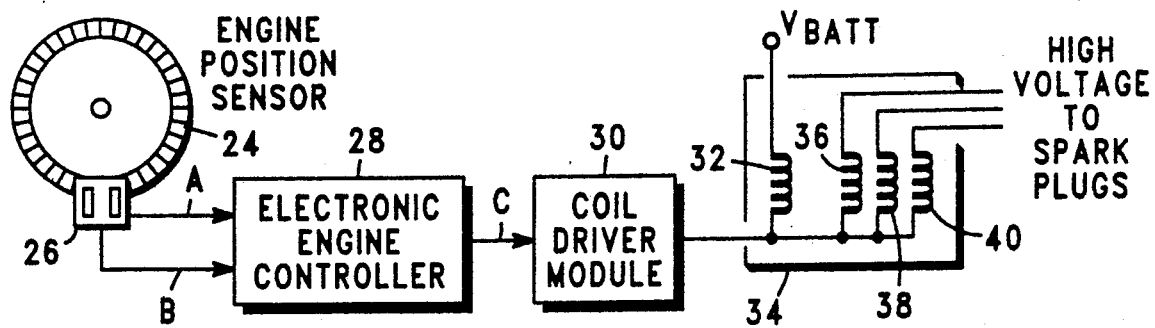
*FIG.3*
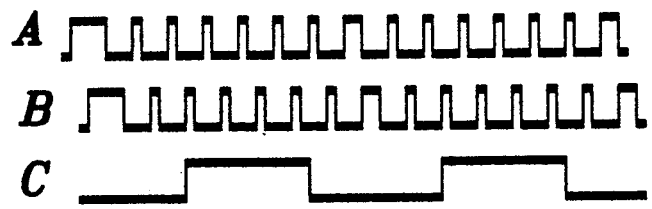
*FIG.4*
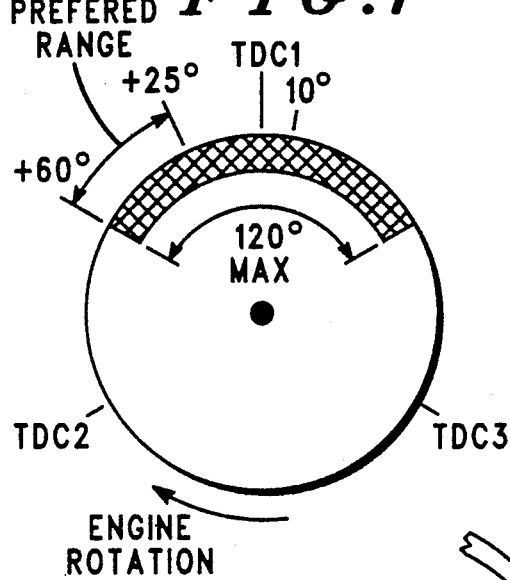
*FIG.1*
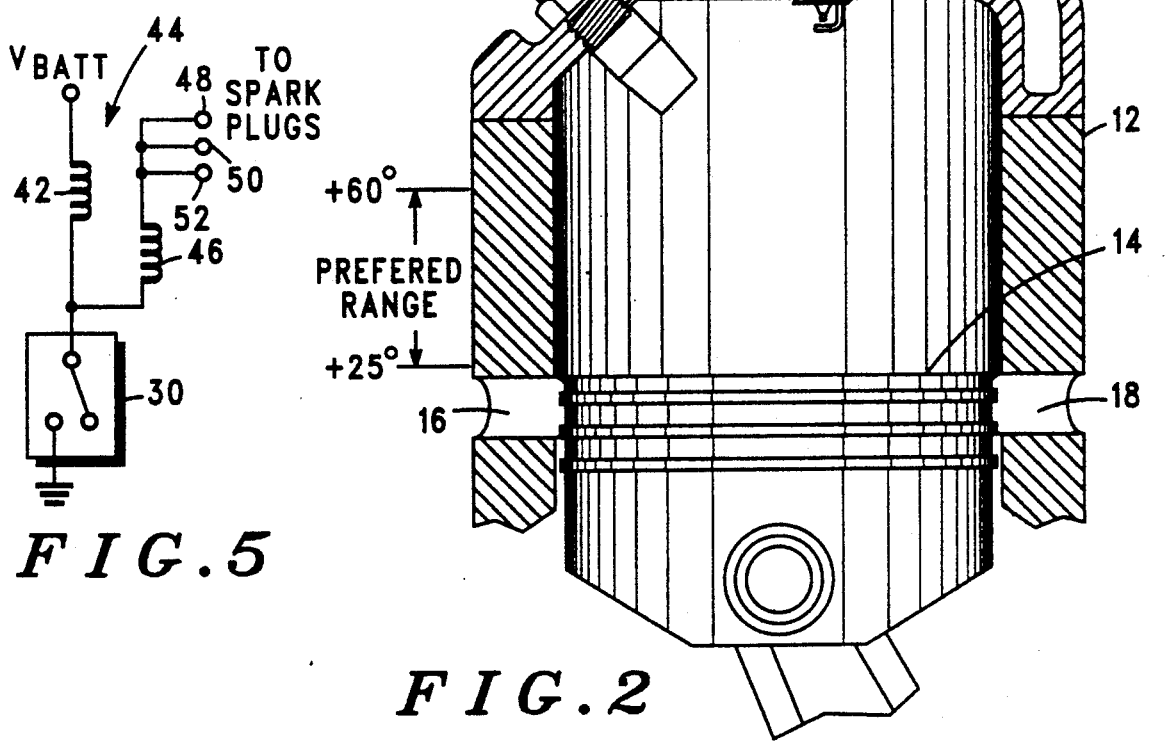
*FIG.5*
*FIG.2*

SIMPLIFIED IGNITION SYSTEM FOR MULTI-CYLINDER ENGINES

FIELD OF THE INVENTION

This invention is directed generally to the field of ignition systems for internal combustion engines. It is particularly applicable to such engines that have three or more cylinders.

BACKGROUND OF THE INVENTION

Conventional ignition systems typically apply firing potentials to their engine cylinders in a sequential manner. That is, only one cylinder at a time receives a firing potential, particularly with engines that have more than two cylinders.

Some two cylinder engines that have a carbureted fuel/air intake use a simplified ignition system which applies a firing potential to both cylinders simultaneously. This simplification is possible because, with just two cylinders, only the correct cylinder will actually experience combustion; the spark plug for the other cylinder will spark, but no combustion will occur due to the lack of a combustible fuel/air mixture therein. This permits the use of a more simple ignition system, including the absence of a distributor. However, the simplified ignition system has not been used to apply a firing potential to three or more cylinders simultaneously because at least two of the cylinders would be likely to contain combustible fuel/air mixtures at the same time.

OBJECTS OF THE INVENTION

It is a general object of the invention to provide an improved method and apparatus for applying firing potentials to the cylinders of engines having three or more cylinders.

It is a more specific object of the invention to provide such a method and apparatus that is more simple and economical than presently available techniques.

BRIEF DESCRIPTION OF THE FIGURES

FIG. 1 schematically illustrates the firing sequence of an exemplary three cylinder, two-cycle engine, along with an indication of a preferred range of firing points in accordance with this invention;

FIG. 2 shows a two-cycle engine cylinder with its piston, spark plug, and fuel injector;

FIG. 3 is a schematic diagram showing an exemplary ignition system that may be used to generate and apply an ignition potential to spark plugs in accordance with this invention;

FIG. 4 shows various waveforms (A,B,C) produced by the system depicted in FIG. 3; and FIG. 5 shows an alternate form of ignition coil that may be used with the system shown in FIG. 3.

DESCRIPTION OF THE PREFERRED EMBODIMENT

According to one of the principles of this invention, it is possible to use a simpler method for igniting fuel in engine cylinders by taking advantage of the fact that, in certain engines, and with certain restrictions that are discussed below, an ignition potential can be applied to all cylinders of an engine simultaneously. With this technique, combustion will occur only in the desired cylinder, while a harmless spark is generated in the other cylinders. No distributor is required because all cylinders receive the same ignition potential at the same time.

According to one step of the present method, fuel is sequentially injected directly into each cylinder of an engine that has at least three cylinders, as by using conventional fuel injectors. This allows a greater usable range (as contrasted to carbureted engines) over which an ignition potential can safely be applied to all cylinders simultaneously. Then, an ignition potential is applied to all cylinders simultaneously, but at an ignition angle that ensures that only a selected one of the cylinders experiences combustion. This technique is repeated for each remaining cylinder, so as to fire one cylinder at a time even though an ignition potential is applied to all cylinders simultaneously.

The present technique is particularly applicable to two-cycle engines; thus, the description which follows focuses primarily on an exemplary two-cycle engine and an ignition system therefore. It will be evident, however, that the invention can also be applied to four-cycle engines under appropriate conditions.

Turning now to FIG. 1, the illustrated timing diagram shows TDC (Top Dead Center) positions for cylinders 1, 2 and 3 of a typical three cylinder, two-cycle engine. In this engine, the present technique causes direct injection of fuel into the cylinders so as to safely allow an ignition potential to be applied to all cylinders simultaneously. Such direct fuel injection means that there will be, at most, 120 degrees of engine rotation during which combustion is possible in any one cylinder. FIG. 1 shows this 120° range (as indicated by the cross-hatched area 10) for the illustrated position of engine rotation. In other words, an ignition potential can safely be applied to the spark plugs of all three cylinders of a directinjected engine during this 120° range of engine rotation, while causing combustion only in cylinder no. 1. In contrast, the cylinders of a conventional carbureted engine can experience combustion over a wider range, thus substantially precluding the use of a simultaneously-applied ignition potential except in the case of a two cylinder engine.

For best operation of the engine, it is preferred to apply the ignition potential so that substantial combustion in the cylinder to be fired occurs within a range of from about 25° after TDC to 60° after TDC. This range is shown in FIGS. 1 and 2. To initiate such combustion, a firing signal to be described later is generated somewhat sooner, such as at about 25 degrees before TDC.

Referring to FIG. 2, an engine cylinder 12 for a two-cycle engine is shown as including a piston 14, intake and exhaust ports 16 and 18, a spark plug 20, and a conventional fuel injector 22. After fuel is injected only into the cylinder 12 by the fuel injector 22, an ignition potential is applied to the spark plug 20, and simultaneously to the spark plugs for all the other cylinders in the engine, so as to cause combustion to occur in the cylinder 12 when the piston 14 is in the illustrated preferred range between 25° and 60° after TDC.

As the engine rotates, fuel would then be directly injected into the next cylinder to be fired, and an ignition potential would again be applied to all spark plugs so as to cause combustion to occur when the piston of this next cylinder is in the preferred range of 25° to 60° after its own TDC. This same process continues for each cylinder of the engine.

As a result of this technique, a more simple and reliable ignition system, one without a distributor, can be used. Such an ignition system is shown in FIG. 3, to which reference is now made.

The ignition system shown in FIG. 3 includes an engine position sensor which may include an optical encoder 24 that rotates in synchronization with the engine and that has a pattern of slots around its periphery. A dual optical sensor 26 "reads" the slots carried by the rotating encoder 24 and converts that information to a pair of electrical signals A and B as shown in FIG. 4. The operation of the encoder 24 and the sensor 26 are discussed more fully in application Ser No. 431,721, filed Nov. 2, 1989, the teachings of which are incorporated herein by reference. These signals A and B contain information relating to engine position and are used by the remainder of the ignition system to generate properly timed ignition potentials.

Alternately, the encoder 24 may be replaced by a toothed wheel encoder, and the sensor 26 may be replaced by a reluctance sensor.

The signals A and B are applied to a conventional electronic engine controller 28, which may be, for example, a micro-processor-based EEC-IV controller manufactured by Motorola, Inc. This controller generates an output signal C (see FIG. 4) that controls ignition firing time. Each negative-going edge of the pulses in signal C results in the generation of an ignition potential that is applied to all the engine's spark plugs simultaneously.

A coil driver module 30 receives the signal C and, in response to each positive-going transition in the signal C, grounds the primary winding 32 of an ignition coil 34. This results in a rapid rise of current in the primary winding 32. The next negative-going transition in the signal C causes the primary winding to be ungrounded, thereby generating ignition potentials in the secondary windings 36, 38, and 40. As shown, the secondary windings may be coupled in parallel with each other, with each winding carrying an ignition potential to one of three spark plugs. Thus, all three spark plugs are fired simultaneously. The controller 28 is programmed to control the timing of the signal C so as to ensure that substantial combustion within each cylinder occurs within the preferred range discussed above.

Referring now to FIG. 5, the coil driver module is shown schematically as a switch which grounds one end of the primary winding 42 of an alternate ignition coil 44. In this case, the secondary of the ignition coil includes a single secondary winding 36 with multiple taps 48, 50, 52. These taps are equal in number to the number of spark plugs to be fired, and serve to couple an ignition potential to all the spark plugs simultaneously.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. A method for igniting fuel in an engine that has at least three cylinders, comprising:
    injecting fuel sequentially directly into the cylinders; and
    applying an ignition potential to all cylinders simultaneously and at an ignition angle that is selected to ignite only one cylinder at a time.

2. A method as set forth in claim 1 herein the ignition angle is selected to cause substantial combustion within the range of from about 25° after TDC (top dead center) to about 60° after TDC.

3. A method as set forth in claim 1 herein the engine is a two-cycle engine.

4. A method for igniting fuel in two-cycle engine that has N groups of cylinders, with three cylinders in each group, and where N is an integer equal to or greater than 1, the method comprising:
    injecting fuel sequentially directly into the cylinders; and
    applying an ignition potential to all cylinders in a group simultaneously and at an ignition angle that is selected to cause substantial combustion in only one cylinder in the group at a time.

5. A method as set forth in claim 4 wherein N equals two, and wherein the ignition potential is first applied to all cylinders in one of the groups, after which the ignition potential is applied to all cylinders in the other group.

6. An ignition system for use with a two-cycle engine that has at least three cylinders and a spark plug for each cylinder, comprising:
    means for directly injecting fuel sequentially into the cylinders;
    ignition means coupling an ignition potential to at least three of the spark plugs simultaneously; and
    means controlling the ignition means for causing the coupling of the ignition potential to the spark plugs to occur cyclically at an ignition angle selected to ignite only one spark plug at a time.

7. An ignition system as set forth in claim 6 wherein the ignition means includes an ignition coil having a primary winding and multiple secondary windings, each secondary winding being adapted to be coupled to a spark plug.

8. An ignition system as set forth in claim 6 wherein the ignition means includes an ignition coil having a primary winding and a secondary winding, and including multiple taps, equal in number to the number of spark plugs, for coupling the secondary winding to the spark plugs.

9. In an automotive vehicle having a two-cycle, three cylinder, gasoline-powered engine having at least one spark plug for each cylinder, an ignition system for igniting the spark plugs, and means for injecting gasoline directly into the cylinders, the improvement comprising:
    ignition means coupling an ignition potential to all three of the spark plugs simultaneously; and
    means controlling the ignition means for causing the coupling of the ignition potential to the spark plugs to occur at an ignition angle selected to ignite only one spark plug at a time.

* * * * *